US008600436B2

(12) United States Patent
Haartsen (10) Patent No.: US 8,600,436 B2
(45) Date of Patent: Dec. 3, 2013

(54) MOBILE ASSISTED CHANNEL SELECTION IN DEVICES HAVING MULTIPLE RADIO TRANSCEIVERS

(75) Inventor: Jacobus Cornelius Haartsen, Hardenberg (NL)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 0 days.

(21) Appl. No.: 13/254,269

(22) PCT Filed: Oct. 19, 2010

(86) PCT No.: PCT/IB2010/002678
§ 371 (c)(1),
(2), (4) Date: Sep. 1, 2011

(87) PCT Pub. No.: WO2012/052791
PCT Pub. Date: Apr. 26, 2012

(65) Prior Publication Data
US 2013/0072209 A1    Mar. 21, 2013

(51) Int. Cl.
*H04M 1/00* (2006.01)
(52) U.S. Cl.
USPC .............. 455/552.1; 455/550.1; 455/63.1; 455/501
(58) Field of Classification Search
USPC ................ 455/552.1, 550.1, 63.1, 501
See application file for complete search history.

(56) References Cited

U.S. PATENT DOCUMENTS

| | | | | |
|---|---|---|---|---|
| 2007/0004336 | A1* | 1/2007 | Aloni-Lavi et al. | 455/63.1 |
| 2007/0165754 | A1 | 7/2007 | Kiukkkonen et al. | |
| 2009/0017756 | A1* | 1/2009 | Tsfaty et al. | 455/41.2 |
| 2009/0262785 | A1* | 10/2009 | Wilhelmsson | 375/133 |
| 2010/0197235 | A1* | 8/2010 | Wilhelmsson | 455/63.3 |

OTHER PUBLICATIONS

Search Report and Written Opinion of the International Searching Authority for PCT/IB2010/002678 mailed Jul. 22, 2011.
International Preliminary Report on Patentability Corresponding to International Application No. PCT/IB2010/002678; Date of Mailing: May 2, 2013; 10 Pages.

* cited by examiner

*Primary Examiner* — Danh Le
(74) *Attorney, Agent, or Firm* — Myers Bigel Sibley & Sajovec, P.A.

(57) ABSTRACT

A wireless communication device includes a first radio frequency (RF) transceiver configured to transmit/receive RF signals in a first frequency band, a second RF transceiver configured to transmit/receive RF signals in a second frequency band that may be different from the first frequency band, and a connection manager that is coupled to the first and second RF transceivers and that assists with channel selection by the first and second RF transceivers to reduce mutual interference between the first and second RF transceivers. Related methods are also disclosed.

14 Claims, 6 Drawing Sheets

MOBILE ASSISTED CHANNEL SELECTION IN DEVICES HAVING MULTIPLE RADIO TRANSCEIVERS

RELATED APPLICATION

The present application is a 35 U.S.C. §371 national stage application of PCT International Application No. PCT/IB2010/002678, having an international filing date of Oct. 19, 2010, the disclosure of which is incorporated by reference in its entirety.

BACKGROUND

Wireless communication devices, such as mobile telephones, include an increasing number of different RF transceivers (radios) to support access to a number of wireless communication services, such as cellular access, local access (e.g., WiFi), ad-hoc connectivity (e.g., Bluetooth), and positioning, such as by the global positioning system (GPS). The cellular radios operate in licensed bands defined by 3GPP. WiFi and Bluetooth both operate in the unlicensed industrial-scientific-medical (ISM) bands at around 2.4 GHz and 5 GHz. Due to the close physical proximity of the transceivers in the device, referred to herein as co-location, and the increasing proximity (in the frequency domain) of the operating frequencies of the transceivers, interaction between the radios becomes more likely, which can cause detrimental performance effects.

With the continuous success of cellular communications, both for voice and data, frequency regulating and specification bodies are constantly seeking make more spectrum available. New cellular radio bands are creeping towards existing bands used for local connectivity. For example Universal Mobile Telecommunications System (UMTS) band 40 (2300-2400 MHz) and UMTS band 7 (2500-2690 MHz) are very close to the 2.4 GHz ISM band (2400-2483.5 MHz) and co-location problems become more likely, potentially leading to mutual interference and/or blocking issues between transceivers operating in different bands. The transmit signals of high-power radio transmitters may impact the sensitivity of the radio receivers. Steep filtering may be required as channels become more closely spaced in frequency (increasing costs, power, and size), but even that may fail when there are no guard bands for the filter to roll off over. For instance, between band 40 and the 2.4 GHz ISM band, no guard band is provided.

SUMMARY

A wireless communication device according to some embodiments includes a first radio frequency (RF) transceiver configured to transmit/receive RF signals in a first frequency band, a second RF transceiver configured to transmit/receive RF signals in a second frequency band that is different from the first frequency band, and a connection manager that is coupled to the first and second RF transceivers and that assists with channel selection by the first and second RF transceivers to reduce mutual interference between the first and second RF transceivers.

The first RF transceiver may be configured to send first channel assignment information to the connection manager indicative of a first channel on which the first RF transceiver transmits and/or receives RF communication signals, and the second RF transceiver may be configured to send second channel assignment information to the connection manager indicative of a second channel on which the second RF transceiver transmits and/or receives RF communication signals. The connection manager may be configured to analyze the first channel assignment information and the second channel assignment information to determine if there may be potential mutual interference between RF communication signals transmitted/received on the first channel and RF communication signals transmitted/received on the second channel.

In response to determining that there may be potential mutual interference between RF communication signals transmitted/received on the first channel and RF communication signals transmitted/received on the second channel, the connection manager may be configured to send a channel re-selection signal to the first RF transceiver and/or the second RF transceiver instructing it to select a different channel for transmission/reception of RF communication signals.

In response to receiving the channel re-selection signal, the first RF transceiver and/or the second RF transceiver may be configured to send a channel modification request to a remote network access point requesting that a new channel be assigned for transmission/reception of RF communication signals.

The channel modification request may include a channel quality indicator (CQI) that indicates that the assigned channel has a poor quality.

The first RF transceiver may be configured to transmit/receive RF signals in the first frequency band according to a first wireless communication protocol, and the second RF transceiver may be configured to transmit/receive RF signals in the second frequency band according to a second wireless communication protocol that may be different from the first wireless communication protocol.

The first RF transceiver may include a Bluetooth transceiver, and the first RF transceiver may be configured to select frequency hop carriers that do not conflict with a frequency used by the second RF transceiver.

The connection manager may be configured to determine that there may be potential mutual interference between the first channel and the second channel in response to the first channel being spaced less than a distance R hertz from the second channel, wherein R is determined in response to front end filter characteristics of the first and second RF transceivers.

The connection manager may be configured to determine that there may be potential mutual interference between the first channel and the second channel if the first channel may be spaced less than a distance R hertz from an edge of the second frequency band, wherein R is equal to a width of a 30 dB roll-off point of a band filter in the first or second RF transceivers.

The connection manager may be configured to determine that there may be potential mutual interference between the first channel and the second channel if both the first channel is spaced less than a distance R2 hertz from an edge of the second frequency band and the second channel is spaced less than a distance R1 hertz from an edge of the first frequency band, and wherein R1 and R2 are determined in response to front-end filter characteristics of the first and second RF transceivers.

Methods are provided of operating a wireless communication device including a first radio frequency (RF) transceiver configured to transmit/receive RF signals in a first frequency band, a second RF transceiver configured to transmit/receive RF signals in a second frequency band that is different from the first frequency band, and a connection manager coupled to the first and second RF transceivers. The methods include analyzing RF channels assigned to the first and second RF transceivers to characterize a level of mutual interference between the first and second RF transceivers, and rejecting an assigned channel in response to the level of mutual interference between the first and second RF transceivers.

The methods may further include sending first channel assignment information from the first RF transceiver to the connection manager indicative of a first channel on which the first RF transceiver transmits and/or receives RF communication signals, sending second channel assignment information from the first RF transceiver to the connection manager indicative of a second channel on which the second RF transceiver transmits and/or receives RF communication signals, and analyzing the first channel assignment information and the second channel assignment information to determine if there may be potential mutual interference between RF communication signals transmitted/received on the first channel and RF communication signals transmitted/received on the second channel.

The methods may further include sending a channel re-selection signal to the first RF transceiver and/or the second RF transceiver instructing it to select a different channel for transmission/reception of RF communication signals in response to determining that there may be potential mutual interference between RF communication signals transmitted/received on the first channel and RF communication signals transmitted/received on the second channel.

The methods may further including sending a channel modification request from the first RF transceiver and/or the second RF transceiver to a remote network access point requesting that a new channel be assigned for transmission/reception of RF communication signals in response to receiving the channel re-selection signal.

The channel modification request includes a channel quality indicator (CQI) that indicates that the assigned channel has a poor quality.

The first RF transceiver may transmit/receive RF signals in the first frequency band according to a first wireless communication protocol, and the second RF transceiver may transmit/receive RF signals in the second frequency band according to a second wireless communication protocol that is different from the first wireless communication protocol.

The first RF transceiver may include a Bluetooth transceiver, the method further including selecting frequency hop carriers that do not conflict with a frequency used by the second RF transceiver.

The methods may further include determining that there may be potential mutual interference between the first channel and the second channel in response to the first channel being spaced less than a distance R hertz from the second channel, wherein R may be equal to a width of a 30 dB roll-off point of a band filter in the first or second RF transceivers.

The methods may further include determining by the connection manager that there may be potential mutual interference between the first channel and the second channel if the first channel may be spaced less than a distance R hertz from an edge of the second frequency band, wherein R may be equal to a width of a 30 dB roll-off point of a band filter in the first or second RF transceivers.

The connection manager may be configured to determine that there may be potential mutual interference between the first channel and the second channel in response to the first channel being spaced less than a distance R2 hertz from an edge of the second frequency band and the second channel being spaced less than a distance R1 hertz from an edge of the first frequency band, and wherein R1 may be equal to a width of a 30 dB roll-off point of a band filter in the first RF transceiver, and wherein R2 may be equal to a width of a 30 dB roll-off point of a band filter in the second RF transceiver.

Other systems, methods, and/or computer program products according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The accompanying drawings, which are included to provide a further understanding of the invention and are incorporated in and constitute a part of this application, illustrate certain embodiment(s) of the invention. In the drawings.

DETAILED DESCRIPTION OF EMBODIMENTS

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

As used herein, a "wireless communication device" includes, but is not limited to, a device that is configured to receive/transmit communication signals via a wireless interface with, for example, a cellular network, a wireless local area network (WLAN), a digital television network such as a DVB-H network, a satellite network, an AM/FM broadcast transmitter, and/or another communication terminal. A wireless communication device may be referred to as a "wireless communication terminal," a "wireless terminal" and/or a "mobile terminal." Examples of wireless communication devices include, but are not limited to, a satellite or cellular radiotelephone; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; and a conventional laptop and/or palmtop receiver or other appliance that includes a radio transceiver, including WLAN routers and the like.

Wireless communication between electronic devices may be accomplished using a wide variety of communication media, communication systems and communication standards. For example, wireless communication devices, such as wireless mobile telephones, are typically configured to communicate via analog and/or digital wireless radio frequency (RF) telephone systems. Such devices may additionally be configured to communicate using wired and/or wireless local area networks (LANs), short range communication channels, such as Bluetooth RF communication channels and/or infrared communication channels, and/or long range communication systems, such as satellite communication systems.

According to some embodiments, a wireless communication device includes a plurality of RF communication modules that communicate with remote terminals (e.g., other communication devices, base stations, access points, etc.), using RF signals transmitted and/or received over a dedicated or shared antenna in the wireless communication device. Each of the RF communication modules is configured to operate within a defined frequency band. In particular, each of the RF communication modules may communicate with remote terminals using a channel selected from a plurality of channels within the frequency band.

Channel selection, also referred to as channel assignment or channel allocation, refers to the selection and assignment of RF channels within a wireless communication system. In a typical RF communication system, such as a cellular or PCS mobile communications system, channel selection is performed by a resource scheduler in a radio access network of the communication system, rather than by the individual wireless communication devices in the system. Channel selection may be performed with a goal of efficiently allocating RF spectrum to maximize data bandwidth and/or reduce co-channel interference between devices within the system, a goal of reducing average power consumption by wireless communication devices within the system, a goal of reducing average bit error rate of communications, and/or other goals.

Channel allocation/assignment schemes may be categorized as fixed channel assignment or dynamic channel assignment. In dynamic channel assignment schemes, channels can be re-assigned in response to changes in the communication system and/or the RF communication environment. In a cellular communication system, such channel re-assignment is typically performed under the control of and at the direction of a resource scheduler in a node of a radio access network that can monitor such factors as channel usage, channel demand, co-channel and adjacent channel interference levels, and other factors. When the scheduler determines that it is desirable for a wireless communication terminal in the system to switch to a new channel for transmission/reception, the scheduler may send a control channel message to the wireless communication terminal instructing it to tune its transmitter/receiver to a new channel for transmission/reception.

However, a communication system may be unaware of other RF communication modules that are co-located in the wireless communication device and that may operate on frequencies that are near the frequencies used by the RF communication system. Transmission/reception by such other RF communication modules can cause co- and/or adjacent-channel interference with the RF communication module in the wireless communication device that may not be detected/detectable by the communication system.

In order to cope with the coexistence of different RF transceivers in the same device, a number of different solutions have been considered. For example, it has been proposed to use different antennas with a large isolation between them. Providing multiple isolated antennas within a wireless communication device may result in less interaction between antennas and less interference between signals transmitted/received by the RF transceivers in the device. However, this requires sufficient spacing between antennas and/or antenna directivity. Separation between antennas is increasingly difficult as device dimensions are shrinking, and directivity may be impractical for some wireless communication devices, such as mobile phones, unless costly and powerful adaptive beam-forming techniques are used.

It has also been proposed to apply time division duplex to communications by the various RF transceivers in a device so that only one RF transceiver is active at one moment in time, or so that the RF transceivers all transmit or all receive at the same time. However, such approaches may be difficult to implement as they require coordination between RF transceivers that operate according to different standards and/or may effectively limit the throughput of the radios.

Spectrum is a scarce resource, and regulators and the telecommunications industry are continuously seeking to make more spectrum available to serve the increased need for capacity. Because very high frequencies (above 5 GHz) are not suitable for long range applications due to higher propagation attenuation, nor the very low frequencies (below 500 MHz) for small-sized devices, due to reduced efficiency for small antennas, the focus has been on available spectrum between about 800 MHz and 4 GHz. As a result, the separation between frequency bands diminishes. Filters having steeper roll-off characteristics can help address the problem of mutual interference. However, for filters operating at 2 GHz, at least a 1% guard band may be needed for even the steepest filters, which results in a guard band of 15-20 MHz. Smaller guard bands would need still steeper filters which may add cost, size, and/or more insertion loss, which results in less sensitivity of the radio receiver (and therefore reduced range). With the increased need for more capacity, however, 20 MHz guard bands may be undesirable.

Applying a TDD solution may require close interaction between media access control (MAC) protocols of the different radios. Packet scheduling (time domain scheduling) of the different radios may be required to avoid a situation in which one radio transmits while the other receives. Radio protocols based on packet radio, time division multiple access (TDMA), and/or time division duplexing (TDD) allow for a crude time scheduling alignment but have a major impact on the specifications. However, radios that operate continuously, such as frequency division duplexing (FDD) and/or code division multiple access (CDMA) are excluded from this coexistence solution since they are active constantly both in uplink and downlink.

Some embodiments coordinate the selection of channels by two or more RF transceivers within a wireless communication device. In particular, a wireless communication device according to some embodiments assists in channel selection within the radio bands used by different RF transceivers in the device. If co-location problems arise because channels used by different RF transceivers are spaced too closely together in the frequency domain, the wireless communication device can suggest to one or more of the applicable transceivers and/or their associated networks, for example the cellular network, the WiFi network, and/or the peer Bluetooth device, to reallocate the channels so that there will be more separation between the radio channels and therefore less mutual interaction between the RF transceivers.

According to some embodiments, smart frequency scheduling is performed for a plurality of RF transceivers in the same wireless communication device. Smart frequency scheduling may involve the wireless communication device helping the system to find channels in the assigned radio bands that are sufficiently spaced apart. The scheduling assistance may only be needed when multiple RF transceivers within the wireless communication device are operating simultaneously.

Figure 1:
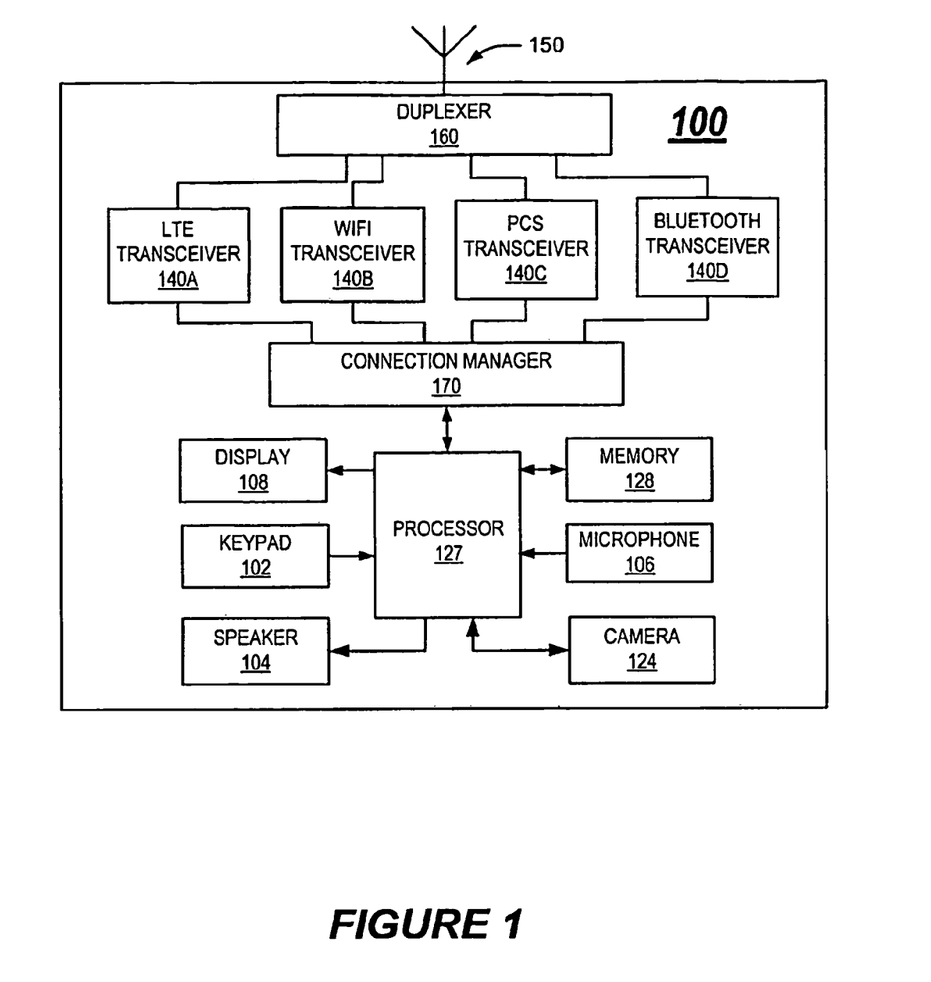
FIG. 1 is a schematic illustration of a wireless communication terminal according to some embodiments.

A wireless communication device 100 according to some embodiments is illustrated in FIG. 1.

In particular, the wireless communication device 100 is configured to transmit and/or receive wireless signals over one or more wireless communication interfaces. For example, a wireless communication device 100 according to some embodiments can include a cellular communication transceiver, a Bluetooth transceiver, an infrared communication transceiver, a global positioning system (GPS) receiver, a WLAN transceiver, and/or other types of communication modules.

With a cellular communication transceiver, the wireless communication device 100 can communicate using one or more cellular communication protocols such as, for example, Advanced Mobile Phone Service (AMPS), ANSI-136, Global Standard for Mobile (GSM) communication, General Packet Radio Service (GPRS), enhanced data rates for GSM evolution (EDGE), code division multiple access (CDMA), wideband-CDMA, CDMA2000, Universal Mobile Telecommunications System (UMTS), and Long Term Evolution (LTE).

With a Bluetooth or infrared transceiver, the wireless communication device 100 can communicate via an ad-hoc network using a direct wireless interface. With a WLAN transceiver, the wireless communication device 100 can communicate through a WLAN router using a communication protocol that may include, but is not limited to, 802.11a, 802.11, 802.11e, 802.11g, and/or 802.11i.

A wireless communication device 100 my additionally include an AM/FM radio tuner, a UHF/VHF tuner, a satellite radio tuner, a DVB-H receiver, and/or another receiver configured to receive a broadcast audio/video signal and/or data signal.

The wireless communication device 100 includes a display 108, such as a liquid crystal display (LCD) and/or an organic light emitting diode (OLED) display. The wireless communication device 100 may optionally include a keypad 102 or other user input mechanism on the front housing 110 of the device 100. In some embodiments, the display 108 may be provided with touchscreen capability to replace and/or supplement the keypad 102.

The wireless communication device 100 may include a microphone 106 and an earphone/speaker 104. The housing of the device 100 may be designed to form an acoustic seal to the user's ear when the earphone/speaker 104 is placed against the user's head.

The keypad 102, display 108, microphone 106, speaker 104 and camera 124 may be coupled to a processor 127, such as a microprocessor or microcontroller, which may be configured to control operations of the device 100.

The device 100 may further include a plurality of transceivers 140A to 140D including, for example, an LTE transceiver 140A, a WiFi transceiver 140B, a cellular/PCS transceiver 140C and/or a Bluetooth transceiver 140D. Other or fewer RF transceivers may be included in the device 100 as described above.

The device 100 further includes a connection manager 170 that is coupled to the RF transceivers 140A to 140D and to the processor 127. The connection manager 170 may be implemented using, for example, a general programmable microprocessor and/or a special purpose controller. Although illustrated as a separate component, the connection manager 170 may be implemented as a module within the processor 127 in some embodiments. The connection manager communicates with the RF transceivers 140A to 140D to control/assist in the selection of channels for transmission/reception by the RF transceivers 140A to 140D so as to reduce mutual interference therebetween.

The device 100 further includes a memory 128 coupled to the processor 127. Other electronic circuitry, such as a GPS interface, a digital signal processor, etc., may also be included in the electronic circuitry of the device 100.

The transceivers 140A to 140D typically include a transmitter circuit, a receiver circuit, and a modem, which cooperate to transmit and receive radio frequency signals to remote transceivers via an antenna 150. The RF transceivers 140A to 140D communicate with the antenna 150 through a duplexer 160. The antenna 150 can include one or more radiating elements. The radio frequency signals transmitted between the device 100 and the remote transceivers may include both traffic and control signals (e.g., paging signals/messages for incoming calls), which are used to establish and maintain communication with another party or destination.

The memory 128 may be a general purpose memory that is used to store both program instructions for the processor 127 as well as data, such as audio data, video data, configuration data, and/or other data that may be accessed and/or used by the processor 127. The memory 128 may include a nonvolatile read/write memory, a read-only memory and/or a volatile read/write memory. In particular, the memory 128 may include a read-only memory in which basic operating system instructions are stored, a non-volatile read/write memory in which re-usable data, such as configuration information, directory information, and other information may be stored, as well as a volatile read/write memory, in which short-term instructions and/or temporary data may be stored.

Figure 2:
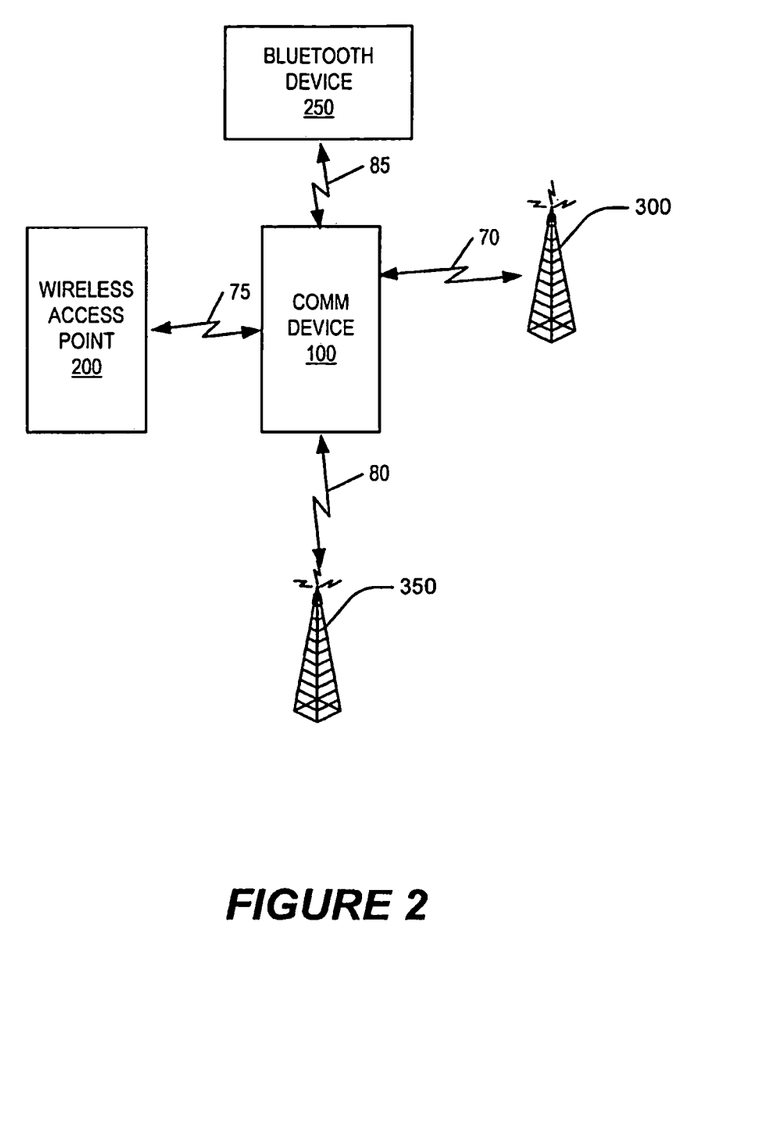
FIG. 2 illustrates wireless communication by a wireless communication terminal according to some embodiments over a plurality of wireless communication interfaces.

FIG. 2 illustrates a system environment in which a wireless communication device 100 according to some embodiments may operate. As shown therein, a wireless communication device 100 according to some embodiments may communicate with a wireless access point 200 of a WiFi communication system via a wireless communication link 75 established between the WiFi transceiver 140B of the wireless communication device 100 and the access point 200. The wireless communication device 100 may also communicate with an eNodeB base station 300 of an LTE communication system via a communication link 70 established by the LTE transceiver 140A of the wireless communication device 100.

The wireless communication device 100 may further communicate with a cellular/PCS base station 350 through a wireless communication link 80, and/or with a Bluetooth enabled device 250 over a wireless Bluetooth communications link 85.

Figure 3:
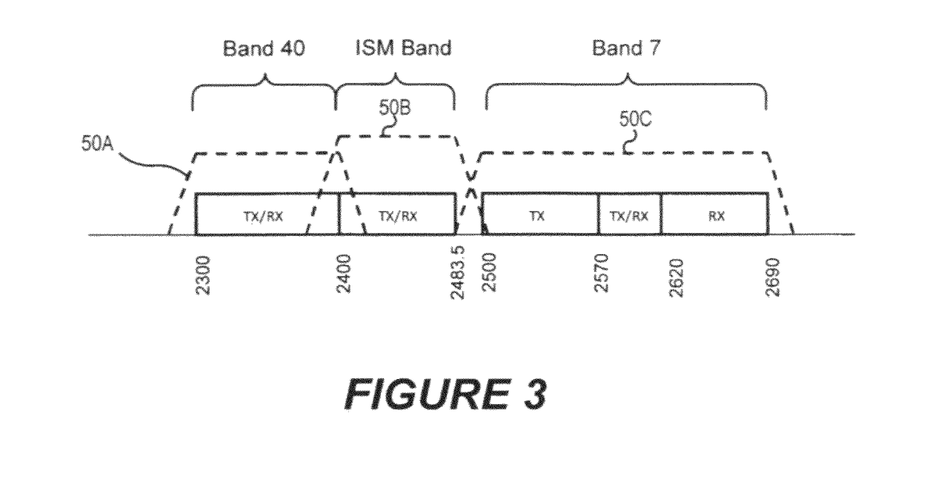
FIG. 3 illustrates a frequency band arrangement around 2.4 GHz.

As an example of mobile assisted channel allocation according to some embodiments, consider the 2.4 GHz ISM band and the UMTS bands 7 and 40 just above and below the ISM band, respectively. The 2.4 GHz ISM band is defined from 2400 MHz to 2483.5 MHz. UMTS band 7 is defined from 2500 MHz to 2690 MHz, and UMTS band 40 is defined from 2300 MHz to 2400 MHz. Thus, there is no separation between UMTS band 40 and the 2.4 GHz ISM band, and there is only 16.5 MHz separation between UMTS band 7 and the 2.4 GHz ISM band.

The situation is illustrated in FIG. 3. Also shown in FIG. 3 is an allocation of RX (receive) and TX (transmit) operation in the bands. UMTS band 40 is an unpaired TD-LTE (Long Term Evolution) band which applies time division duplexing (TDD). The ISM band is also an unpaired band where TDD is applied. UMTS band 7 is a paired band. The lower frequency range of UMTS band 7 is allocated to the uplink (corresponding to transmit/TX in this band by the communication terminal), while the upper frequency range of UMTS band 7 is allocated to the downlink (corresponding to receive/RX by the communication terminal).

FIG. 3 also shows example band filter characteristics 50A, 50B and 50C of the filters applied to the TX/RX signals (dashed lines) in UMTS band 40, the ISM band and UMTS band 7, respectively. The pass-bands of the band filters are assumed to cover the entire associated frequency band, and about 30 dB suppression is present at 20 MHz from the band edge.

Figure 4:
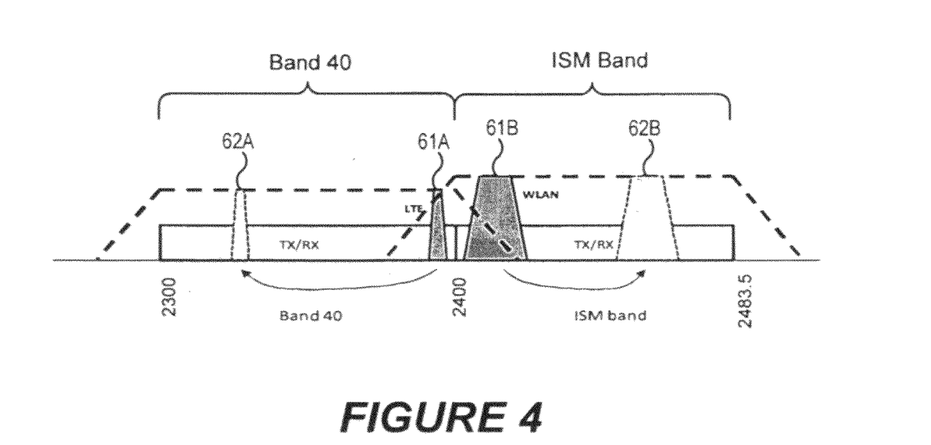
FIG. 4 illustrates re-assignment of channels in frequency bands around 2.4 GHz according to some embodiments.

As a first example, assume that a WiFi transceiver 140B is operating on a channel 61B in the lower part of the ISM band and a Long Term Evolution (LTE) transceiver 140A is operating on a channel 61A in the upper part of band 40, as illustrated in FIG. 4. Initially, the channels selected, which may include a 10 MHz channel 61A for LTE in band 40 and a 22 MHz channel 61B for WiFi in ISM band, are in the positions shown in FIG. 4. Because of the proximity of the channels being used, filtering may not be sufficient to reduce mutual interference between the signals. Due to the limited linearity of the RX front-ends, blocking may result.

For the WiFi transceiver 140B, it would be desirable to move the WiFi channel to a higher part of the ISM band, for example to channel 62B. For this to happen, the wireless communication device 100 may need to re-negotiate with the Access Point (AP) 200 for a re-assignment of the selected channel. Alternatively, the wireless communication device 100 may skew the channel quality reporting, indicating the reception to be bad (i.e. it may exaggerate the quality in a negative sense) so that the access point 200 will move the channel to a higher frequency, as illustrated in FIG. 4. In this example, communications of the WiFi transceiver 140B are moved from channel 61B to channel 62B.

Although the WiFi specification recognizes 14 overlapping channels (with channel spacing of 5 MHz), only three non-overlapping channels are used. The three channels, which are 22 MHz wide each and are spaced at 25 MHz center-to-center, together substantially cover the entire 2.4 GHz band. Usually, only channel numbers 1, 6, and 11 are used. Only the lower channels (with channel numbers 1-3) may be susceptible to interference from a co-located transceiver. Thus, if the wireless communication device requests a channel reassignment of a new channel from channel 1, the AP 200 will select a different channel which is 25 MHz or 50 MHz higher in frequency.

Figure 5:
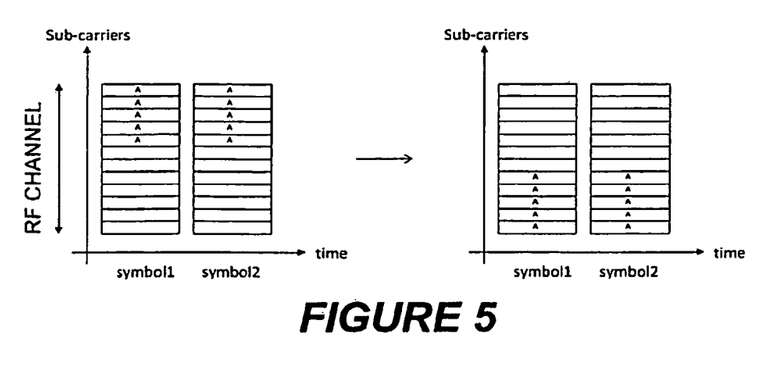
FIG. 5 illustrates frequency domain scheduling in a long term Evolution (LTE) system employing orthogonal frequency division multiplexing according to some embodiments.

For the LTE channel, two methods can be used. LTE applies Orthogonal Frequency Division Multiple Access (OFDMA) with Frequency Domain Scheduling. That is, the allocation of the OFDM sub-carriers is based on the quality of these sub-carriers. Periodically, a Channel Quality Indication (CQI) report is fed back by the wireless communication device to the eNodeB base station 300 to report the quality of the frequency band (pilot signals spread out over the frequency band are used to determine the overall quality). The CQI report of the wireless communication device 100 can be made such that the eNodeB base station 300 will only schedule this particular mobile phone in the lower part of the channel, as illustrated in FIG. 5. In LTE, data is scheduled in resource blocks, each resource block containing 14 OFDM symbols (1 ms) and 12 sub-carriers (180 kHz). FIG. 5 shows how the resource blocks are re-allocated from the upper part to the lower part of RF channel. The CQI report may indicate instantaneous channel quality in both time and frequency domain.

The CQI report only includes reports of the quality of the resource blocks in use (pilot or reference symbols are dispersed through the resource blocks sent in the downlink). In some embodiments, repeated unsuccessful allocation attempts will result in the eNodeB base station 300 changing the allocation based on the CQI reports, so that the eNodeB base station 300 will move the resource allocation away from the disturbed area.

According to some embodiments, a message from the wireless communication device 100 at the radio resource control (RRC) layer is defined that will request that the eNodeB base station 300 allocate resource blocks in a specific part of the band. This may reduce the time and/or resources spent to locate an acceptable channel responsive only to CQI reports.

In still further embodiments, channel sounding may be used to identify an acceptable frequency band. This is a method typically used in the uplink where pilot/reference symbols are dispersed over the entire band. The receiver can then determine based on the quality of the reference symbols which frequency parts in the band are usable. A similar procedure can be followed in the downlink According to some embodiments, a sounding signal that covers the entire band is sent by the eNodeB base station 300 to the wireless communication terminal 100. The wireless communication terminal 100 can then report back a CQI which covers the entire band, and which indicates that resource blocks in the portion of the frequency band near a frequency band used (or potentially to be used) by a co-located transceiver have poor quality. Based on this CQI report, the eNodeB wireless communication terminal 100 knows where not to allocate resource blocks.

Alternatively, the CQI may indicate that the entire channel is bad. In that case, the eNodeB base station 300 may move the entire channel down in frequency, for example, from channel 61A to channel 62A as shown in FIG. 4.

In another example, a Bluetooth transceiver 140D may operate simultaneously with LTE transceiver 140A in band 40. In that case, the selection of carriers in the Adaptive Frequency hopping system of Bluetooth may be such that only hop carriers in the upper part of the ISM are selected. The Bluetooth specification V 4.0 supports this concept (i.e. selection of hop carriers in AFH based on input from the host device, such as a mobile phone).

In the example above, the WiFi radio channel may be placed high in the ISM band to avoid interaction with the radios operating in band 40. In a similar fashion, the WiFi radio channel could be placed low in the ISM band to avoid interaction with the radios operating in band 7.

Bluetooth adaptive frequency hopping (AFH) carrier allocation is defined, for example, in Section 4.1.4 of the Bluetooth Specification version 4.0 [Vol 2]. As noted therein, with the message "LMP_set_AFH", the master instructs the slave to use only a subset of the available carriers. The AFH protocol data unit (PDU) as described in Table 4.5 of the Bluetooth Specification defines the "LMP_set_AFH" message as including an AFH_Instant field, an AFH_mode field, and an AFH_Channel_Map field.

The AFH_Instant field refers to a future time point when AFH begins in at the master and slave devices. The AFH_mode field indicates enabling or disabling of AFH. The AFH_Channel_Map field indicates a subset of 79 frequency carriers, which indicates which carriers can be used and which cannot be used for the frequency hopping.

Figure 6:
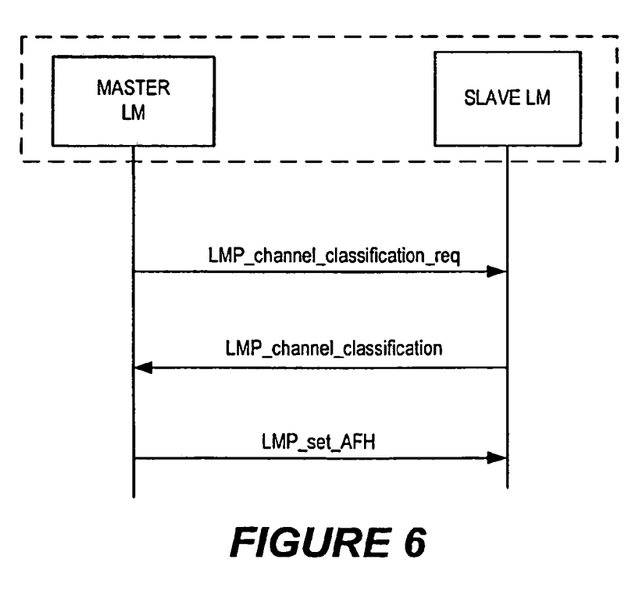
FIG. 6 illustrates a link manager protocol message sequence to set adaptive frequency hopping by paired Bluetooth devices.

According to some embodiments, a wireless communication device 100 may send an AFH PDU to a remote Bluetooth device 250. In the AFH_Channel Map_field, the lower (in case of interference with band 40) or higher (in case of interference with band 7) frequency carriers may be blocked out (i.e. not used for frequency hopping). The master device sends the link manager protocol (LMP) message "LMP_set_AFH" to the slave device to force it to use a subset of the available carriers. In embodiments in which the wireless communication device 100 is the Bluetooth master, the wireless communication device 100 will create its own channel map. If the wireless communication device 100 is a Bluetooth slave, the wireless communication device 100 can send the LMP message "LMP_channel_classification" to the remote master device 250 in which it indicates which carriers are bad. In the end, it will always be the master that sets the final channel map. The master may ask the slave to give its assessment of the carriers via the message "LMP_channel_classification_req" as shown in FIG. 6, The frequency hopping channel and frequency hopping sequence used to convey these LMP message is the current channel in use. The future point in time as set in the AFH_instant field indicates when a new frequency hopping channel is used. Any new LMP messages (including those for changing yet again the subset of carriers) is conveyed over this new channel until the next AFH-instant that may be specified.

In a GSM system, the messages for channel allocation are conveyed over the downlink control channels. At connection setup this will be the Access Grant Channel (AGCH) which is part of the Common Control Channel (CCCH). The layer-3 message "Immediate Assignment" includes the RF carrier allocated to the mobile station (MS). This message is sent from the base transceiver system (BTS) to the MS.

During the connection, a different carrier can be allocated via the layer-3 message "Assignment command" which includes the RF carrier to be allocated to the MS. The assignment message is sent by the BTS to the MS via the Slow Associated Control Channel (SACCH).

Mobile assisted channel allocation according to some embodiments can be implemented in an LTE system as follows. In the LTE downlink, the first n OFDM symbols (n<4) are used for downlink control signaling. In these OFDM channels, assignment messages are sent to the user equipment (UE) (corresponding to the wireless communication device 100) to indicate which resource blocks (set of carriers+time slots) are used for downlink and/or uplink communications.

According to some embodiments of the invention, the channels used by different RF transceivers may be spaced far enough apart that the filters in the transceivers can sufficiently reduce the mutual interference between the transceivers. Since the wireless communication device knows which radios are in operation at a given time and knows which bands are in use, the wireless communication device can indicate to the networks which RF channels it prefers. In some embodiments, the wireless communication device may take action if 1) multiple transceivers are operating simultaneously, and 2) the channels in use by the transceivers are spaced so closely together that mutual interference is likely. In some embodiments, a connection manager in the wireless communication device controls the assistance of channel selection.

By causing the networks to use channels that are sufficiently spaced apart in the frequency domain, the transceivers in a wireless communication device, such as a small portable communication device, may be able to operate without undesirable performance degradation and/or without the need for costly, large-sized front-end filters. Accordingly, systems/methods according to some embodiments can reduce the overall cost and/or size of a wireless communication device.

Figure 7:
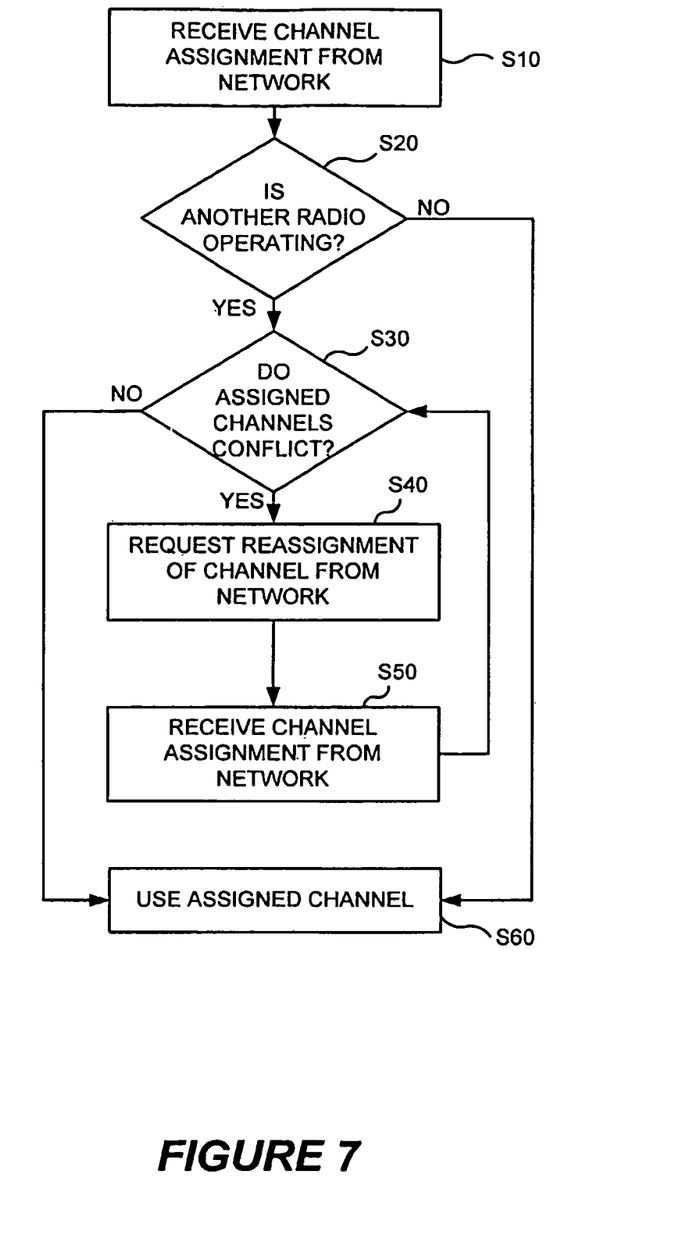
FIG. 7 is a flowchart that illustrates operations of channel selection systems/methods according to some embodiments.

Systems/methods according to some embodiments are illustrated in more detail in FIG. 7, which is a flowchart of operations that may be performed by a wireless communication device according to some embodiments. Referring to FIG. 7, a wireless communication device 100 including a plurality of RF transceivers 140A to 140D (FIG. 1) receives a channel assignment from a network, such as from a base station 300 or a wireless access point 200 (Block S10). The channel assignment identifies a channel that one of the transceivers 140A to 140D in the wireless communication device 100 is authorized to use for uplink (transmit) and/or downlink (receive) communications.

In Block S20, the wireless communication device 100 determines if another one of the RF transceivers 140A to 140D is currently operating in the device. If another one of the RF transceivers 140A to 140D is currently operating in the device, the wireless communication device 100 determines if the assigned channel conflicts with any channel that is currently in use by the device 100 (Block S30). That is, in some embodiments, the wireless communication device 100 may determine if a frequency in the assigned channel is located less than a defined frequency distance from a band edge of a channel and/or a frequency band already in use by the wireless communication device. In some embodiments, the defined frequency distance may be based on the characteristics of one or more bandpass filters used in the wireless communication device 100. For example, the defined frequency distance may be a 30 dB roll-off bandwidth, as described below.

Figure 8:
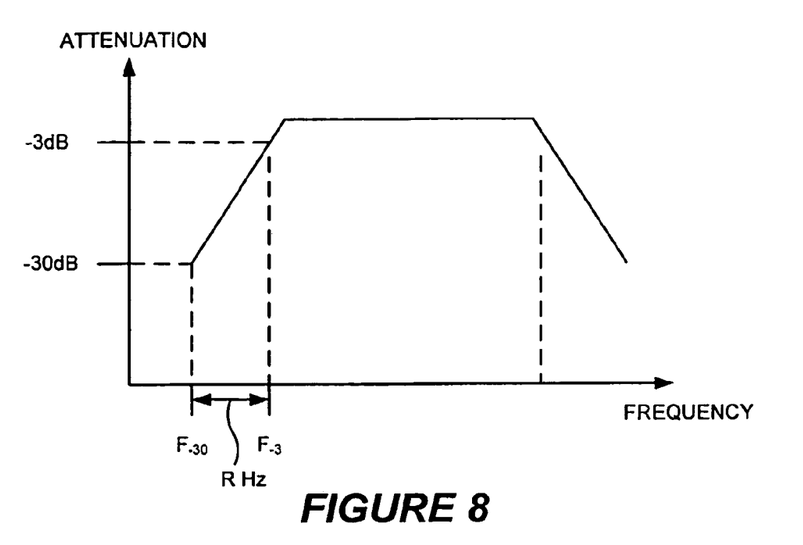
FIG. 8 illustrates bandpass filter roll-off characteristics.

For example, assume a first RF transceiver including is operating in the device 100 and using a first channel within a first frequency band. The bandpass filter of the first frequency band has a 30 dB roll-off point (i.e., the point at which the signal is attenuated by 30 dB) that is R Hz from the edge of the first frequency band, which may be defined in some systems as the −3 dB rolloff point of the filter, as illustrated in FIG. 8. The roll-off bandwidth in such a case may be R Hz. In general, it is desirable to operate co-located transceivers in bands where the signals from an adjacent band are suppressed by 30 dB or more, referenced to the band edges.

It will be appreciated that each of the RF transceivers in the wireless communication device 100 may employ bandpass filters having different roll-off characteristics. Thus, the roll-off bandwidth R of the band filter of one of the RF transceivers may be different than the roll-off bandwidth R of the band filter of another one of the RF transceivers.

When the wireless communication device 100 receives a channel assignment for a second RF transceiver within the device 100 from an associated network, the wireless communication device checks to see if the channel assigned for the second RF transceiver is within R Hz of a the first channel If so, the wireless communication device may determine that the assigned channels conflict.

In some embodiments, the wireless communication device may check to see if both the first channel is within R Hz of the second frequency band and that the second channel is within R Hz of the first frequency band (as illustrated in FIG. 3), in which case the wireless communication device may determine that the assigned channels conflict. It will be appreciated that the roll-off bandwidth R may be different for the different channels, e.g. the roll-off bandwidth R for the first channel may be different from the roll-off bandwidth for the second channel. That is, the existence of a conflict may be determined by determining the frequency separation between the assigned channels and/or by determining the frequency separation between the assigned channels and the adjacent frequency bands.

If it is determined that the assigned channels conflict, the wireless communication device 100 may request reassignment of one or both of the conflicting channels from their associated networks (Block S40). Once the wireless communication device 100 has received a new channel assignment (Block S50), operations return to Block S30 to determine if the reassigned channels conflict. If it is determined in Block S20 that no other radio is operating in the wireless communication device 100, or if it is determined in Block S30 that the channels do not conflict, the assigned channels are used for communications (Block S60).

In some embodiments, the connection manager 170 can scan the frequency bands and identify a free channel to suggest back to the base station or access point. Alternatively or additionally, the connection manager 170 can inform the networks of an acceptable frequency range from which to choose the new channel. The different radios 140A-D in the wireless communications device 100, including their associated interference levels and filter characteristics are known at design time. This data can be stored in a lookup table for the connection manager 170 to use when checking to determine whether channel allocations are too close together. Alternatively, the connection manager 170 can receive CQI reports from the radios 140A-D themselves. With that information, the connection manager can request the networks to reallocate the channels.

Figure 9:
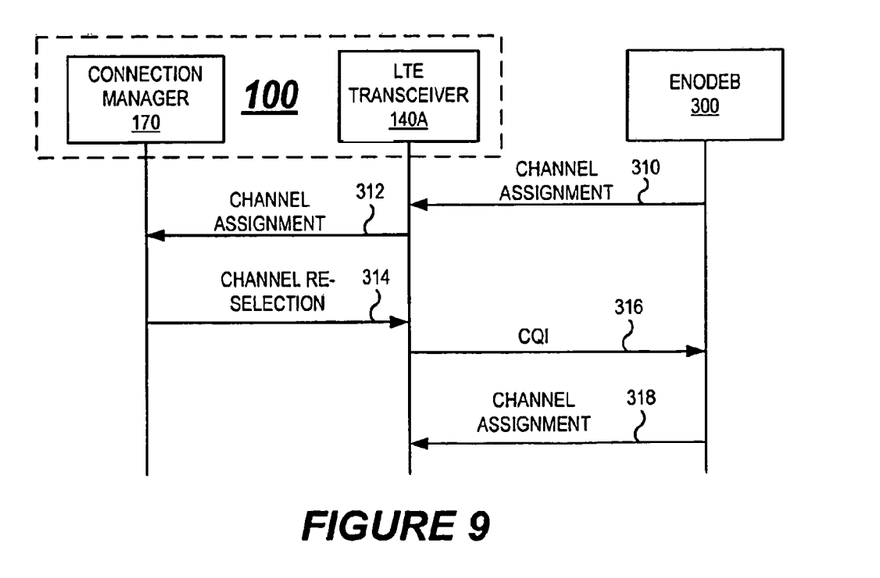
FIG. 9 is a flow diagram that illustrates operations of channel selection systems/methods according to some embodiments.

Message flows according to some embodiments of the invention are illustrated in FIG. 9, which illustrates channel re-selection by an LTE transceiver 140A and a connection manager 170 in a wireless communication device 100.

After registration with the LTE network, the LTE transceiver 140A receives a channel assignment 310 from an eNodeB base station 300. The LTE transceiver 140A sends channel assignment information 31 to the connection manager 170 indicating the channel/subcarriers that have been assigned to the LTE transceiver 140A. The connection manager 170 analyzes the assigned channel/subcarriers and determines if the channel assignment conflicts or potentially conflicts with an existing channel assignment being used by another transceiver in the wireless communication device as discussed above, due to inadequate spacing between the assigned channels.

In response to determining that a conflict or potential conflict exists, the connection manager 170 sends a channel re-selection signal 314 to the LTE transceiver 140A, which in turn sends a channel quality indication (CQI) 316 to the eNodeB base station 300 indicating that the assigned channel has a poor quality. In some embodiments, the connection manager may send an explicit message, other than a CQI report, to the nNodeB base station 300 informing it which frequencies to use or not to use. The eNodeB base station 300 may then send an updated channel assignment 318 to the LTE transceiver 140A.

As will be appreciated by one of skill in the art, the present invention may be embodied as a method, data processing system, and/or computer program product. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a tangible computer usable storage medium having computer program code embodied in the medium that can be executed by a computer. Any suitable tangible computer readable medium may be utilized including hard disks, CD ROMs, optical storage devices, or magnetic storage devices.

Some embodiments of the present invention are described above with reference to flowchart illustrations and/or block diagrams of methods, systems and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language. The program code may execute entirely on the user's computer, partly on the user's computer, as a stand alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed typical embodiments of the invention and, although specific terms are employed, they are used in a generic and descriptive sense only and not for purposes of limitation, the scope of the invention being set forth in the following claims.

That which is claimed is:

1. A wireless communication device, comprising:
a first radio frequency (RF) transceiver configured to transmit/receive RF signals in a first frequency band;
a second RF transceiver configured to transmit/receive RF signals in a second frequency band that is different from the first frequency band; and
a connection manager that is coupled to the first and second RF transceivers and that is configured to assist with channel selection by the first and second RF transceivers to reduce mutual interference between the first and second RF transceivers; wherein:
the first RF transceiver is configured to send first channel assignment information to the connection manager indicative of a first channel on which the first RF transceiver transmits and/or receives RF communication signals;
the second RF transceiver is configured to send second channel assignment information to the connection manager indicative of a second channel on which the second RF transceiver transmits and/or receives RF communication signals; and
the connection manager is configured to analyze the first channel assignment information and the second channel assignment information to determine if there is potential mutual interference between RF communication signals transmitted/received on the first channel and RF communication signals transmitted/received on the second channel;
wherein in response to determining that there is potential mutual interference between RF communication signals transmitted/received on the first channel and RF communication signals transmitted/received on the second channel, the connection manager is configured to send a channel re-selection signal to the first RF transceiver and/or the second RF transceiver instructing it to select a different channel for transmission/reception of RF communication signals; and
wherein in response to receiving the channel re-selection signal, the first RF transceiver and/or the second RF transceiver is configured to send a channel modification request to a remote network access point requesting that a new channel be assigned for transmission/reception of RF communication signals.

2. The wireless communication device of claim 1, wherein the channel modification request comprises a channel quality indicator (CQI) that indicates that the assigned channel has a poor quality.

3. The wireless communication device of claim 1, wherein the first RF transceiver is configured to transmit/receive RF signals in the first frequency band according to a first wireless communication protocol, and the second RF transceiver is configured to transmit/receive RF signals in the second frequency band according to a second wireless communication protocol that is different from the first wireless communication protocol.

4. A wireless communication device, comprising:
a first radio frequency (RF) transceiver configured to transmit/receive RF signals in a first frequency band;
a second RF transceiver configured to transmit/receive RF signals in a second frequency band that is different from the first frequency band; and
a connection manager that is coupled to the first and second RF transceivers and that is configured to assist with channel selection by the first and second RF transceivers to reduce mutual interference between the first and second RF transceivers; wherein:
the first RF transceiver is configured to send first channel assignment information to the connection manager indicative of a first channel on which the first RF transceiver transmits and/or receives RF communication signals;
the second RF transceiver is configured to send second channel assignment information to the connection manager indicative of a second channel on which the second RF transceiver transmits and/or receives RF communication signals; and
the connection manager is configured to analyze the first channel assignment information and the second channel assignment information to determine if there is potential mutual interference between RF communication signals transmitted/received on the first channel and RF communication signals transmitted/received on the second channel;
wherein in response to determining that there is potential mutual interference between RF communication signals transmitted/received on the first channel and RF communication signals transmitted/received on the second channel, the connection manager is configured to send a channel re-selection signal to the first RF transceiver and/or the second RF transceiver instructing it to select a different channel for transmission/reception of RF communication signals; and wherein the first RF transceiver comprises a Bluetooth transceiver, and wherein the first RF transceiver is configured to select frequency hop carriers that do not conflict with a frequency used by the second RF transceiver.

5. A wireless communication device, comprising:
a first radio frequency (RF) transceiver configured to transmit/receive RF signals in a first frequency band;
a second RF transceiver configured to transmit/receive RF signals in a second frequency band that is different from the first frequency band; and
a connection manager that is coupled to the first and second RF transceivers and that is configured to assist with channel selection by the first and second RF transceivers to reduce mutual interference between the first and second RF transceivers; wherein:
the first RF transceiver is configured to send first channel assignment information to the connection manager indicative of a first channel on which the first RF transceiver transmits and/or receives RF communication signals;
the second RF transceiver is configured to send second channel assignment information to the connection manager indicative of a second channel on which the second RF transceiver transmits and/or receives RF communication signals; and
the connection manager is configured to analyze the first channel assignment information and the second channel assignment information to determine if there is potential mutual interference between RF communication signals transmitted/received on the first channel and RF communication signals transmitted/received on the second channel; and
wherein the connection manager is configured to determine that there is potential mutual interference between the first channel and the second channel in response to the first channel being spaced less than a distance R hertz from the second channel, wherein R is determined in response to front end filter characteristics of the first and second RF transceivers.

6. A wireless communication device, comprising:
a first radio frequency (RF) transceiver configured to transmit/receive RF signals in a first frequency band;
a second RF transceiver configured to transmit/receive RF signals in a second frequency band that is different from the first frequency band; and
a connection manager that is coupled to the first and second RF transceivers and that is configured to assist with channel selection by the first and second RF transceivers to reduce mutual interference between the first and second RF transceivers; wherein:
the first RF transceiver is configured to send first channel assignment information to the connection manager indicative of a first channel on which the first RF transceiver transmits and/or receives RF communication signals;
the second RF transceiver is configured to send second channel assignment information to the connection manager indicative of a second channel on which the second RF transceiver transmits and/or receives RF communication signals; and
the connection manager is configured to analyze the first channel assignment information and the second channel assignment information to determine if there is potential mutual interference between RF communication signals transmitted/received on the first channel and RF communication signals transmitted/received on the second channel; and
wherein the connection manager is configured to determine that there is potential mutual interference between the first channel and the second channel if the first channel is spaced less than a distance R hertz from an edge of the second frequency band, wherein R is equal to a width of a 30 dB roll-off point of a band filter in the first or second RF transceivers.

7. A wireless communication device, comprising:
a first radio frequency (RF) transceiver configured to transmit/receive RF signals in a first frequency band;
a second RF transceiver configured to transmit/receive RF signals in a second frequency band that is different from the first frequency band; and
a connection manager that is coupled to the first and second RF transceivers and that is configured to assist with channel selection by the first and second RF transceivers to reduce mutual interference between the first and second RF transceivers; wherein:
the first RF transceiver is configured to send first channel assignment information to the connection manager indicative of a first channel on which the first RF transceiver transmits and/or receives RF communication signals;
the second RF transceiver is configured to send second channel assignment information to the connection manager indicative of a second channel on which the second RF transceiver transmits and/or receives RF communication signals; and
the connection manager is configured to analyze the first channel assignment information and the second channel assignment information to determine if there is potential mutual interference between RF communication signals transmitted/received on the first channel and RF communication signals transmitted/received on the second channel; and
wherein the connection manager is configured to determine that there is potential mutual interference between the first channel and the second channel if both the first channel is spaced less than a distance R2 hertz from an edge of the second frequency band and the second channel is spaced less than a distance R1 hertz from an edge of the first frequency band, and wherein R1 and R2 are determined in response to front-end filter characteristics of the first and second RF transceivers.

8. A method of operating a wireless communication device including a first radio frequency (RF) transceiver configured to transmit/receive RF signals in a first frequency band, a second RF transceiver configured to transmit/receive RF signals in a second frequency band that is different from the first frequency band, and a connection manager that is coupled to the first and second RF transceivers, the method comprising:
analyzing RF channels assigned to the first and second RF transceivers to characterize a level of mutual interference between the first and second RF transceivers;
rejecting an assigned channel in response to the level of mutual interference between the first and second RF transceivers;
sending first channel assignment information from the first RF transceiver to the connection manager indicative of a first channel on which the first RF transceiver transmits and/or receives RF communication signals;
sending second channel assignment information from the first RF transceiver to the connection manager indicative of a second channel on which the second RF transceiver transmits and/or receives RF communication signals;
analyzing the first channel assignment information and the second channel assignment information to determine if there is potential mutual interference between RF communication signals transmitted/received on the first channel and RF communication signals transmitted/received on the second channel;

sending a channel re-selection signal to the first RF transceiver and/or the second RF transceiver instructing it to select a different channel for transmission/reception of RF communication signals in response to determining that there is potential mutual interference between RF communication signals transmitted/received on the first channel and RF communication signals transmitted/received on the second channel; and sending a channel modification request from the first RF transceiver and/or the second RF transceiver to a remote network access point requesting that a new channel be assigned for transmission/reception of RF communication signals in response to receiving the channel re-selection signal.

9. The method of claim 8, wherein the channel modification request comprises a channel quality indicator (CQI) that indicates that the assigned channel has a poor quality.

10. The method of claim 8, wherein the first RF transceiver transmits/receives RF signals in the first frequency band according to a first wireless communication protocol, and the second RF transceiver transmit/receives RF signals in the second frequency band according to a second wireless communication protocol that is different from the first wireless communication protocol.

11. A method of operating a wireless communication device including a first radio frequency (RF) transceiver configured to transmit/receive RF signals in a first frequency band, a second RF transceiver configured to transmit/receive RF signals in a second frequency band that is different from the first frequency band, and a connection manager that is coupled to the first and second RF transceivers, the method comprising:

analyzing RF channels assigned to the first and second RF transceivers to characterize a level of mutual interference between the first and second RF transceivers;

rejecting an assigned channel in response to the level of mutual interference between the first and second RF transceivers;

sending first channel assignment information from the first RF transceiver to the connection manager indicative of a first channel on which the first RF transceiver transmits and/or receives RF communication signals;

sending second channel assignment information from the first RF transceiver to the connection manager indicative of a second channel on which the second RF transceiver transmits and/or receives RF communication signals;

analyzing the first channel assignment information and the second channel assignment information to determine if there is potential mutual interference between RF communication signals transmitted/received on the first channel and RF communication signals transmitted/received on the second channel; and sending a channel re-selection signal to the first RF transceiver and/or the second RF transceiver instructing it to select a different channel for transmission/reception of RF communication signals in response to determining that there is potential mutual interference between RF communication signals transmitted/received on the first channel and RF communication signals transmitted/received on the second channel;

wherein the first RF transceiver comprises a Bluetooth transceiver, the method further comprising selecting frequency hop carriers that do not conflict with a frequency used by the second RF transceiver.

12. A method of operating a wireless communication device including a first radio frequency (RF) transceiver configured to transmit/receive RF signals in a first frequency band, a second RF transceiver configured to transmit/receive RF signals in a second frequency band that is different from the first frequency band, and a connection manager that is coupled to the first and second RF transceivers, the method comprising:

analyzing RF channels assigned to the first and second RF transceivers to characterize a level of mutual interference between the first and second RF transceivers;

rejecting an assigned channel in response to the level of mutual interference between the first and second RF transceivers;

sending first channel assignment information from the first RF transceiver to the connection manager indicative of a first channel on which the first RF transceiver transmits and/or receives RF communication signals;

sending second channel assignment information from the first RF transceiver to the connection manager indicative of a second channel on which the second RF transceiver transmits and/or receives RF communication signals;

analyzing the first channel assignment information and the second channel assignment information to determine if there is potential mutual interference between RF communication signals transmitted/received on the first channel and RF communication signals transmitted/received on the second channel; and determining that there is potential mutual interference between the first channel and the second channel in response to the first channel being spaced less than a distance R hertz from the second channel, wherein R is equal to a width of a 30 dB roll-off point of a band filter in the first or second RF transceivers.

13. A method of operating a wireless communication device including a first radio frequency (RF) transceiver configured to transmit/receive RF signals in a first frequency band, a second RF transceiver configured to transmit/receive RF signals in a second frequency band that is different from the first frequency band, and a connection manager that is coupled to the first and second RF transceivers, the method comprising:

analyzing RF channels assigned to the first and second RF transceivers to characterize a level of mutual interference between the first and second RF transceivers;

rejecting an assigned channel in response to the level of mutual interference between the first and second RF transceivers;

sending first channel assignment information from the first RF transceiver to the connection manager indicative of a first channel on which the first RF transceiver transmits and/or receives RF communication signals;

sending second channel assignment information from the first RF transceiver to the connection manager indicative of a second channel on which the second RF transceiver transmits and/or receives RF communication signals;

analyzing the first channel assignment information and the second channel assignment information to determine if there is potential mutual interference between RF communication signals transmitted/received on the first channel and R-F communication signals transmitted/received on the second channel; and determining by the connection manager that there is potential mutual interference between the first channel and the second channel if the first channel is spaced less than a distance R hertz from an edge of the second frequency band, wherein R is equal to a width of a 30 dB roll-off point of a band filter in the first or second RF transceivers.

14. A method of operating a wireless communication device including a first radio frequency (RF) transceiver configured to transmit/receive RF signals in a first frequency band, a second RF transceiver configured to transmit/receive RF signals in a second frequency band that is different from the first frequency band, and a connection manager that is coupled to the first and second RF transceivers, the method comprising:

analyzing RF channels assigned to the first and second RF transceivers to characterize a level of mutual interference between the first and second RF transceivers; and     rejecting an assigned channel in response to the level of mutual interference between the first and second RF transceivers;

sending first channel assignment information from the first RF transceiver to the connection manager indicative of a first channel on which the first RF transceiver transmits and/or receives RF communication signals;

sending second channel assignment information from the first RF transceiver to the connection manager indicative of a second channel on which the second RF transceiver transmits and/or receives RF communication signals; and analyzing the first channel assignment information and the second channel assignment information to determine if there is potential mutual interference between RF communication signals transmitted/received on the first channel and RF communication signals transmitted/received on the second channel;

wherein the connection manager is configured to determine that there is potential mutual interference between the first channel and the second channel in response to the first channel being spaced less than a distance R2 hertz from an edge of the second frequency band and the second channel being spaced less than a distance R1 hertz from an edge of the first frequency band, and wherein R1 is equal to a width of a 30 dB roll-off point of a band filter in the first RF transceiver, and wherein R2 is equal to a width of a 30 dB roll-off point of a band filter in the second RF transceiver.

\* \* \* \* \*